(12) United States Patent
Maeguchi et al.

(10) Patent No.: US 6,748,819 B2
(45) Date of Patent: Jun. 15, 2004

(54) ROBOT

(75) Inventors: Yuji Maeguchi, Kobe (JP); Hiroyuki Takayama, Kagamihara (JP); Takahiro Inada, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 10/207,574

(22) Filed: Jul. 29, 2002

(65) Prior Publication Data
US 2003/0066373 A1 Apr. 10, 2003

(30) Foreign Application Priority Data

Jul. 30, 2001 (JP) ........................................ 2001-230193

(51) Int. Cl.$^7$ .............................................. B25J 13/00
(52) U.S. Cl. ................................ 74/490.01; 74/490.05; 74/490.08; 414/735; 414/744.2; 901/14; 901/15
(58) Field of Search ......................... 74/490.01, 490.03, 74/490.05, 490.06, 490.08; 414/735, 744.2; 901/14, 15

(56) References Cited

U.S. PATENT DOCUMENTS

| | | | | | |
|---|---|---|---|---|---|
| 3,262,593 | A | * | 7/1966 | Hainer | 414/619 |
| 4,507,043 | A | * | 3/1985 | Flatau | 414/719 |
| 4,718,815 | A | * | 1/1988 | Lindgren | 414/729 |
| 4,776,230 | A | * | 10/1988 | Susnjara | 74/490.01 |
| 5,060,532 | A | * | 10/1991 | Barker | 74/490.01 |
| 5,536,135 | A | * | 7/1996 | Robertson | 414/728 |
| 5,584,646 | A | * | 12/1996 | Lewis et al. | 414/738 |
| 5,622,084 | A | * | 4/1997 | Tellden | 74/490.03 |
| 5,901,613 | A | * | 5/1999 | Forslund | 74/490.03 |
| 6,145,403 | A | * | 11/2000 | Aschenbrenner et al. | 74/490.01 |
| 6,408,710 | B1 | * | 6/2002 | Kullborg et al. | 74/490.03 |

FOREIGN PATENT DOCUMENTS

| | | |
|---|---|---|
| JP | 57-1689 | 1/1982 |
| JP | 61-27688 | 2/1986 |

* cited by examiner

Primary Examiner—David A. Bucci
Assistant Examiner—Colby Hansen
(74) Attorney, Agent, or Firm—Marshall, Gerstein & Borun LLP (57) ABSTRACT

A robot is disclosed in which load torque imposed on motors is reduced and therefore small-sized motors can be used. In the robot, an arm member, a first link, a second link and a third link constitute a parallel linkage, and the first link and the third link are coaxially pivotally supported on a base. With a pivotal shaft for pivotally connecting the second link and the third link, one end of a fourth link having shorter link length than the link length of the third link is pivotally connected to the second and third links and one end of a fifth link having the same link length as that of the fourth link is pivotally connected to the other end of the fourth link. The other end of the fifth link is pivotally supported on the base with a pivotal shaft to which the rotary shaft of the motor is coupled, so that the fifth link can move according to the rotation of the motor.

5 Claims, 10 Drawing Sheets

PRIOR ART

ROBOT

BACKGROUND OF THE INVENTION

The present invention relates to a robot such as articulated manipulators and more particularly to a robot having an arm which makes use of a parallel linkage.

Figure 1:
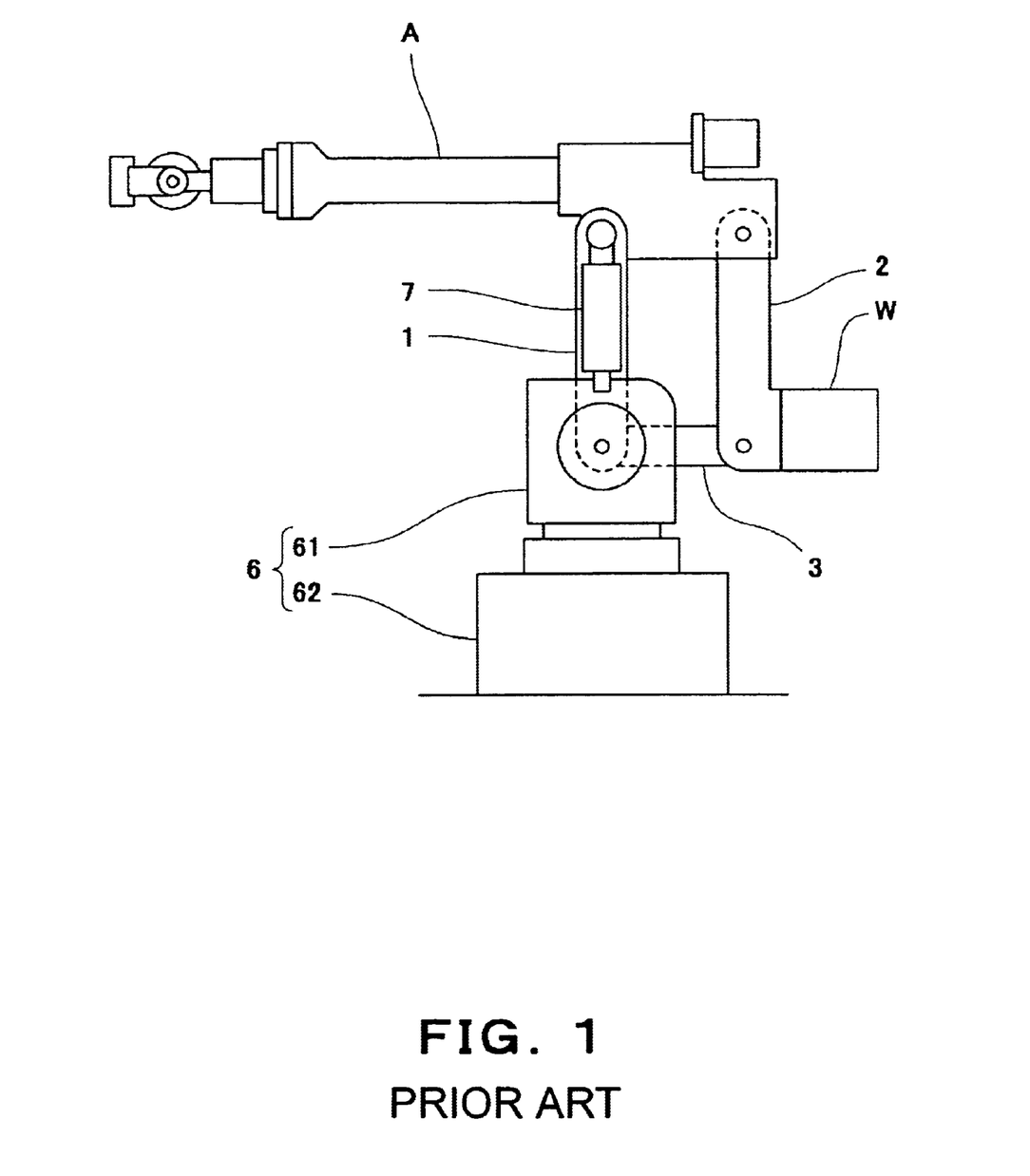
FIG. 1 is a side elevation showing a structure of a conventional robot.

There have been well known robots such as manipulators utilizing a four-bar linkage (e.g., parallel linkage) as an articulation mechanism. FIG. 1 is a side elevation showing a structure of a known robot of this type. The robot shown in FIG. 1 mainly comprises a bar-like arm member A, a first link 1, a second link 2, a third link 3 and a base 6.

Attached to the distal end of the arm member A is an end effector (not shown) such as a hand for gripping a workpiece or a welder for executing welding work on a workpiece. The part around the distal end of the arm member A is able to pivot about the central axis of the arm member A and flex relative to a longitudinal direction of the arm member A.

At the intermediate section of the arm member A somewhat closer to its proximal end when viewed in the longitudinal direction of the arm member A, one end of the first link 1 is pivotally connected by a pivotal shaft which extends in a direction perpendicular to the longitudinal direction of the arm member A. The other end of the first link 1, on the other hand, is pivotally supported on a swivel base 61 by a pivotal shaft extending in substantially the same direction as the above pivotal shaft.

The base 6 is composed of the swivel base 61 and a mount 62. The mount 62 houses a motor, reduction gears and others (not shown) which cause the swivel base 61 to turn in a horizontal direction.

One end of the second link 2 is pivotally connected to the proximal end of the arm member A by a pivotal shaft extending in substantially the same direction as the above pivotal shafts. The link length (i.e., the distance between two pivotal shafts) of the second link 2 is substantially the same as that of the first link 1, and the other end of the second link 2 is pivotally connected to one end of the third link 3 by a pivotal shaft which extends in substantially the same direction as the above pivotal shafts.

The other end of the third link 3 is pivotally supported on the swivel base 61 so as to be coaxial with the other end of the first link 1. The link length of the third link 3 is substantially the same as the distance between the position at which the first link 1 is pivotally connected to the arm member A and the position at which the second link 2 is pivotally connected to the arm member A. Thus, the arm member A, the first link 1, the second link 2 and the third link 3 constitute a parallel linkage.

In the swivel base 61, a motor for causing pivoting of the first link 1 and a motor for causing pivoting of the third link 3 are opposed to each other (not shown). The rotary shaft of one of the motors is coupled to the pivotal shaft of the first link 1 such that the rotation of the motor is transmitted to the first link 1, whereas the rotary shaft of the other motor is coupled to the pivotal shaft of the third link 3 such that the rotation of the motor is transmitted to the third link 3.

The lower part of the second link 2 extends in a direction opposite to the first link 1 and the distal end of the lower part is provided with a balancer weight (weight) W. The balancer weight W is provided in order that it balances the mass of the arm member A, the end effector, a workpiece to be conveyed etc. in the area around the pivotal shaft for supporting the third link 3 on the swivel base 61, so that the load imposed on the motor for causing pivoting of the third link 3 can be reduced.

A spring unit 7 housing a spring is disposed in parallel with the first link 1. One end of the spring unit 7 is pivotally connected to the pivotal shaft for connecting the arm member A and the first link 1, while the other end being pivotally connected to the upper end part of the swivel base 61. With this arrangement, when the first link 1 inclines with the arm member A moving, the spring unit 7 energizes the arm member A in a direction opposite to the moving direction, thereby reducing the load imposed on the motor for causing pivoting of the first link 1.

The conventional robot described above, however, presents the problem that, great load torque is imposed on the motor for causing pivoting of the third link 3 for the following reason, particularly where mass capacity is 100 kg or more.

Figure 2:
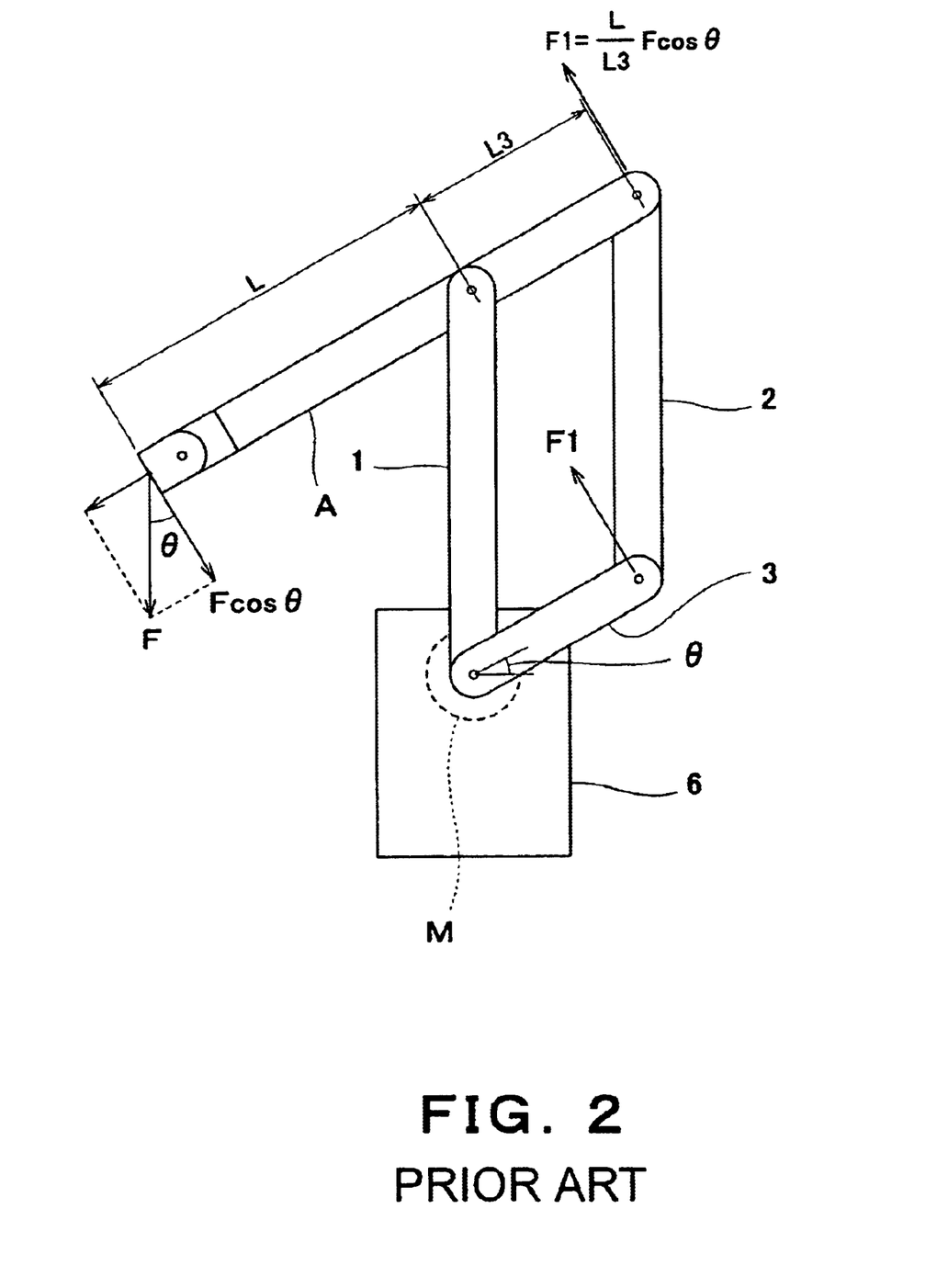
FIG. 2 is a diagrammatic side elevation illustrating a dynamically balanced condition of the conventional robot.

FIG. 2 is a diagrammatic side elevation illustrating a dynamically balanced condition of a conventional robot. As shown in FIG. 2, where a force F is downwardly exerted on the distal end of the arm member A and the third link 3 is inclined from a horizontal position in a counter-clockwise direction in the drawing through an angle $[h]\theta$, the arm member A is also inclined from a horizontal position in the same direction through the angle $[h]\theta$ so that the magnitude of the component of the force F working in a direction perpendicular to the arm member A is $F\cos[h]\theta$. Therefore, the force F1 expressed by Formula (1) is imposed on the proximal end of the arm member A.

$$F1=(L/L3)F \cos [h]\theta \quad (1)$$

In this equation, L designates the length between the position where the arm member A is pivotally connected to the first link 1 and the distal end of the arm member A; and L3 designates the length between the position where the arm member A is pivotally connected to the first link 1 and the position where the arm member A is pivotally connected to the second link 2.

Since the force F1 is imposed, by way of the second link 2, on the position where the third link 3 is pivotally connected to the second link 2 and the link length of the third link 3 is L3, load torque t having a magnitude represented by $F1 \cdot L3$ ($=L \cdot F\cos[h]\theta$) is imposed on the motor M for causing pivoting of the third link 3.

Therefore, where the robot carries a massive workpiece, that is, where the robot has a mass capacity of 100 kg or more, the load on the motor M becomes extremely great which gives rise to a need for a large-sized motor.

In addition, in the above case, since great torque is exerted on the pivotal axis which pivotally supports the third link 3 on the base 6, great stresses are generated in the third link 3, its pivotal shaft and peripheral members. In order to ensure rigidity high enough to withstand the stresses, the sizes of these members are inevitably increased.

In the conventional robot, not only the capacity of the motor M needs to be increased but also the reduction gears coupled to the rotary shaft of the motor M must have a high reduction ratio. As a result, the conventional robot cannot transport a workpiece at high speed.

Another problem presented by the conventional robot is such that while the load on the motor M can be reduced by providing a balancer weight W which can be balanced against the mass of the arm member A, the end effector, the workpiece to be conveyed and others, the balancer weight W should be large in size where the mass capacity is 100 kg or more so that the mass of the robot 1 itself increases, giving rise to a need for a large-sized motor for causing slue of the swivel base 61 in a horizontal direction.

A robot using the so-called hybrid linkage suffers from the following problems.

Figure 3:
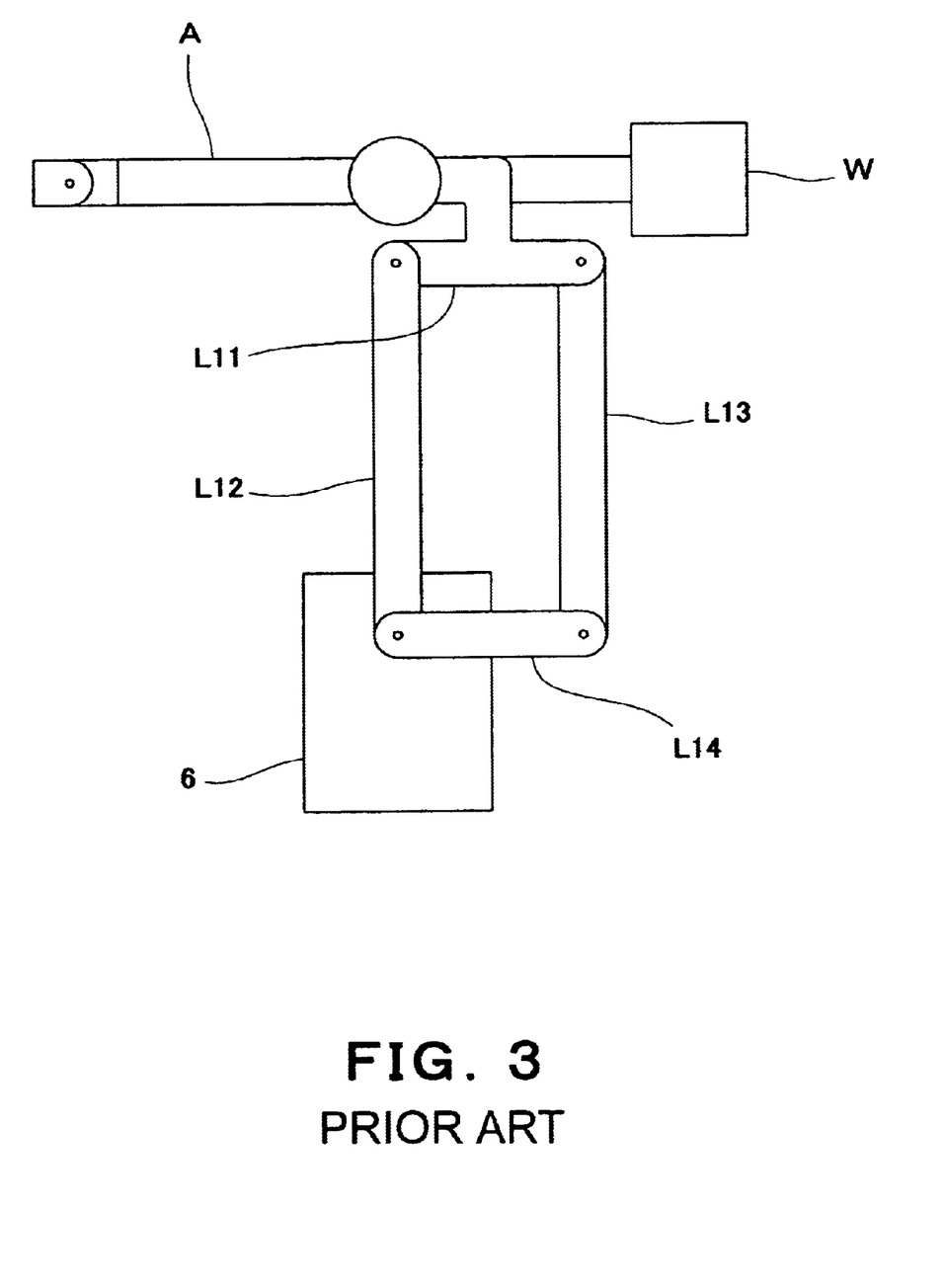
FIG. 3 is a diagrammatic schematic side elevation of a conventional robot which utilizes a hybrid linkage.

FIG. 3 schematically, diagrammatically illustrates a side elevation of a robot using the so-called hybrid linkage. The robot using the hybrid linkage has a parallel linkage composed of four links L11 to L14. Of these links L11 to L14, the laterally extending upper link L11 is provided with an extension part which extends upwardly from the intermediate section of the link L11 when viewed in a longitudinal direction. The extension part is bent midway at substantially right angles, and a motor and reduction gears (not shown) are attached to the distal end of the extension part. The rotary shaft of the motor is coupled to the intermediate section of the arm member A through the reduction gears. Thus, the hybrid linkage is constituted by the links L11 to L14 and the arm member A.

Of the links L11 to L14, the vertically extending link L12 positioned on the side of the distal end of the arm member A and the laterally extending lower link L14 are coaxially pivotally supported on a base 6, and the link L12 is caused to pivot by a motor and reduction gears (not shown) housed in the base 6.

When carrying a massive workpiece (e.g., mass capacity is 100 kg or more) with the above-described robot employing the hybrid linkage, an extremely great load is imposed on the motor for causing pivoting of the arm member A. In order to reduce the load on the motor for the arm member A, the proximal end of the arm member A needs to be extended for attachment of a balancer weight W as shown in FIG. 3, which, in turn, leads to an increase in the load on the motor for causing pivoting of the link L12. Therefore, in the case of the robot employing the hybrid linkage, the loads imposed on the motors extremely increase, for instance, where mass capacity is 100 kg or more so that there arises a need for large-sized motors.

The problems encountered by a robot using the so-called serial linkage will be discussed below.

Figure 4:
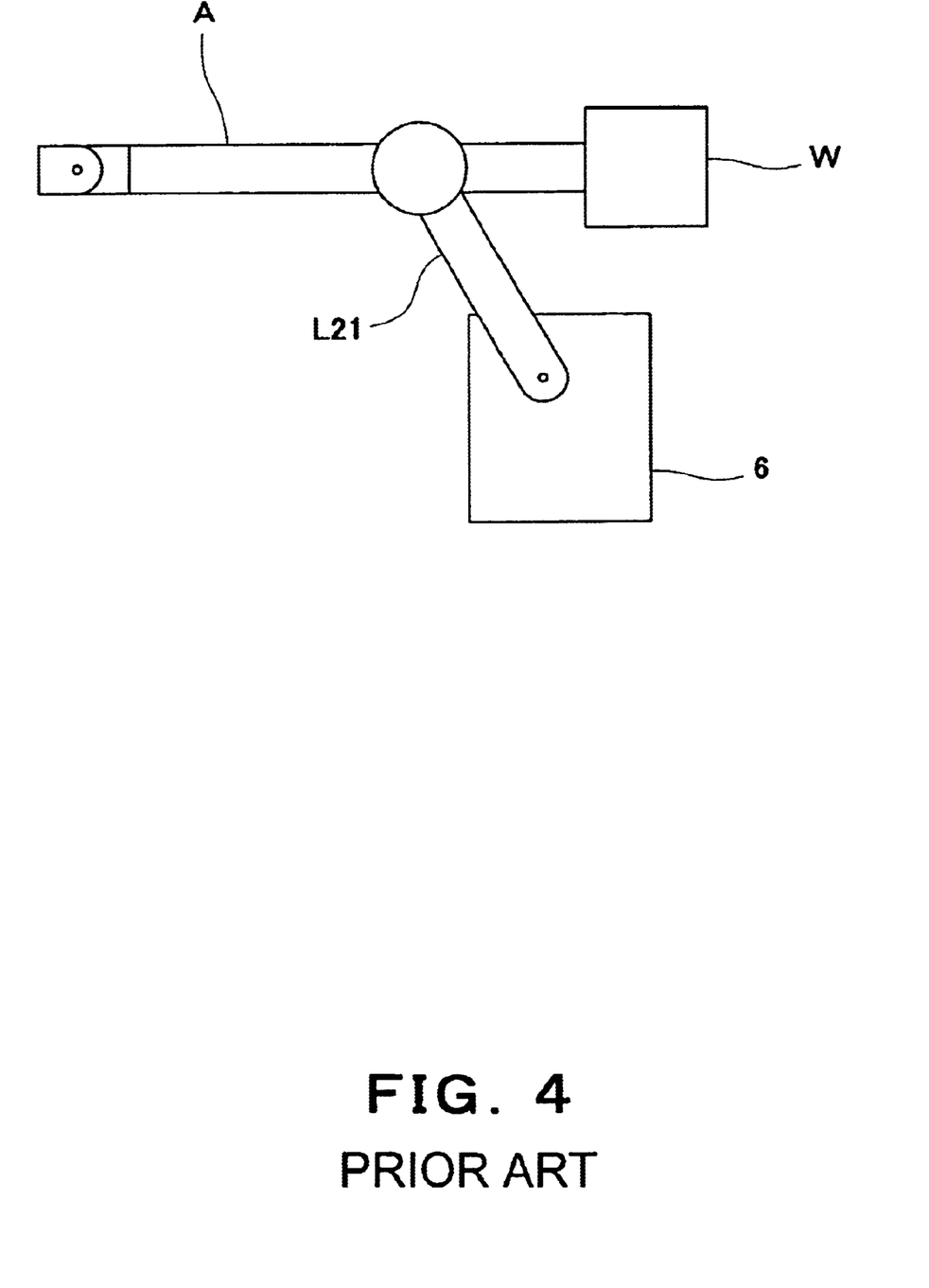
FIG. 4 is a diagrammatic schematic side elevation of a robot which utilizes a serial linkage.

FIG. 4 schematically diagrammatically shows a side elevation of a robot utilizing the serial linkage. The robot using the serial linkage is designed such that, one end of a link L21 is pivotally connected to the intermediate section of an arm member A while the other end of the link L21 being pivotally supported on a base 6. The arm member A and the link L21 thus constitute the serial linkage. Attached to the distal end of the link L21 are a motor and reduction gears (not shown) which cause pivoting of the arm member A. The base 6 also houses a motor and reduction gears (not shown) which cause pivoting of the link L21.

In the robot having such a serial linkage, where a massive workpiece is transported (e.g., mass capacity is 100 kg or more), an extremely great load is imposed on the motor for causing pivoting of the arm member A, and it becomes necessary to extend the proximal end of the arm member A for attachment of a balancer weight W similarly to the case of the hybrid linkage robot in order to reduce the load on the motor for the arm member A. In this case, not only the weight of the workpiece to be conveyed but also the weight of the balancer weight W are imposed as a load on the motor for causing pivoting of the link L21. Therefore, where mass capacity is 100 kg or more in the case of the robot employing the serial linkage, the loads imposed on the motors extremely increase, giving rise to a need for use of large-sized motors.

BRIEF SUMMARY OF THE INVENTION

The invention is directed to overcoming the foregoing drawbacks and a primary object of the invention is therefore to provide a robot in which loads on motors can be reduced without use of a large-sized balancer weight, and motors and various parts smaller in size than those of the conventional robot can be used, and high-speed conveyance of workpieces is enabled.

The above object can be achieved by a robot according to the invention comprising: a base; a bar-shaped arm member having a distal end and a proximal end; a first link one end of which is pivotally connected to an intermediate section of the arm member while the other end being pivotally supported on the base; a second link one end of which is pivotally connected to the proximal end of the arm member; a third link one end of which is pivotally connected to the other end of the second link while the other end being pivotally supported on the base so as to be coaxial with the other end of the first link; a fourth link one end of which is pivotally connected to at least either one of the other end of the second link and the one end of the third link; a fifth link one end of which is pivotally connected to the other end of the fourth link while the other end being pivotally supported on the base, wherein the link length of the fifth link being shorter than that of the third link; and an actuator for causing the fifth link to pivot on the other end of the fifth link, wherein the arm member, the first link, the second link and the third link constitute a four bar linkage.

According to the invention, the load torque exerted on the pivotal shaft for the fifth link can be reduced to a considerable extent, compared to the load torque imposed on the pivotal shaft for the third link of the conventional robot. Therefore, actuators and various parts having smaller sizes than those of the prior art can be employed and high-speed conveyance of workpieces is enabled.

In the invention, it is preferable to pivotally support the other end of the fifth link on the base at a position that is a distance away from the position where the first link and the third link are pivotally supported on the base, the distance being shorter than the link length of the third link. This ensures a sufficient movement range for the robot.

In the invention, the link length of the fifth link is preferably 0.3 to 0.8 times the link length of the third link. With this arrangement, the load torque imposed on the actuator can be prevented from excessively increasing and the movement range for the arm member can be prevented from becoming excessively small.

In the invention, the link length of the fourth link is preferably 0.9 to 1.1 times the link length of the fifth link. With this arrangement, the movement range for the arm member can be prevented from becoming excessively small, the size of the robot itself can be prevented from increasing, and practically sufficient rigidity can be ensured for the area where the fourth link and the fifth link are coupled to each other.

In the invention, it is preferable to set the mass capacity of the robot to 100 kg or more. By virtue of this, a reduction in the production cost for the robot having a mass capacity of 100 kg or more can be expected. In addition, the balancer weight can be more miniaturized and an increase in the size of the robot can be restrained.

The above and further objects and features of the invention will more fully be apparent from the following detailed description with accompanying drawings.

DETAILED DESCRIPTION OF THE INVENTION

Referring now to the accompanying drawings, embodiments of a robot constructed according to the invention will be concretely described below.

Figure 5:
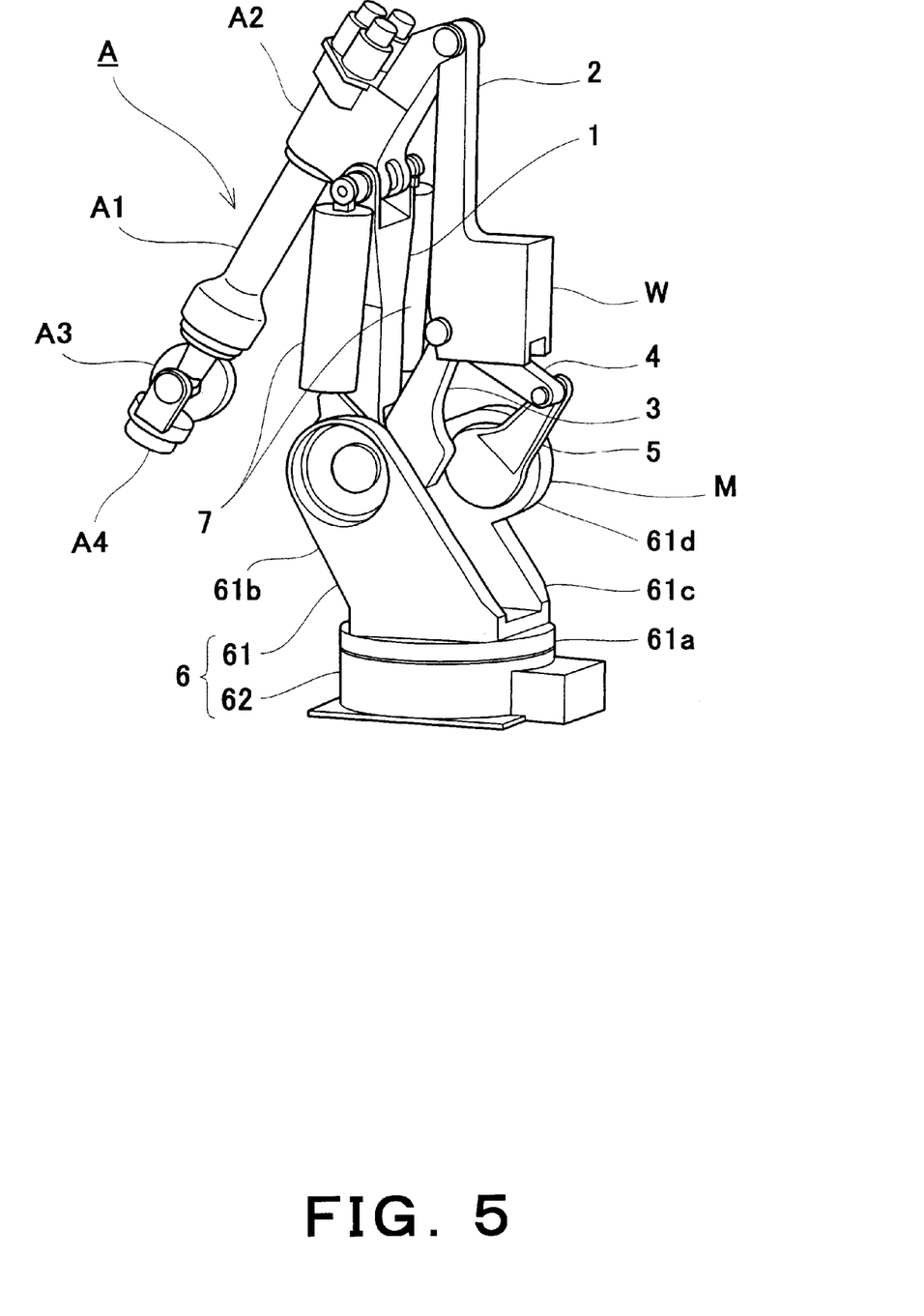
FIG. 5 is a general perspective view of a robot constructed according to an embodiment of the invention.

FIG. 5 is a general perspective view of a robot constructed according to an embodiment of the invention. As shown in FIG. 5, the robot according to the present embodiment mainly comprises an arm member A, a first link 1, a second link 2, a third link 3, a fourth link 4, a fifth link 5 and a base 6.

The arm member A has a substantially saddle-shaped proximal end section A2 and a round-bar-shaped arm body A1 which projects from one end surface of the proximal end section A2. The distal end of the arm body A1 is provided with a revolute joint A3 so that it may pivot about a central axis of the arm body A1 and flex with respect to a longitudinal direction of the arm body A1. At the distal end of the revolute joint A3, a fitting section A4 is provided to which an end effector (not shown) such as a hand for gripping a workpiece or a welder for effecting welding work on a workpiece can be attached. The fitting section A4 also can pivot on its central axis. The arm body A1, the revolute joint A3 and the fitting section A4 respectively pivot so that the action corresponding to the action of a wrist can be achieved.

The intermediate section of the arm member A, that is, the distal end of the proximal end section A2 is elongated in semi-circular form at its lower side. At the center of the semi-circular section, a through hole penetrates in a direction substantially perpendicular to the longitudinal direction of the arm body A1. The first link 1 in the shape of a square bar forks at one end, forming branches and both branches have their respective holes which are defined so as to face each other. The semi-circular section of the proximal end section A2 is held between the branches and a pivotal shaft pierces the holes defined in the proximal end section A2 and the first link 1, so that the arm member A is pivotally connected to the first link 1. The arm member A and the first link 1 make relative movement so that the action corresponding to the action of a knee is enabled.

Secured to the other end of the first link 1 is a pivotal shaft which extends in a direction perpendicular to a longitudinal direction of the first link 1 and is pivotally supported by a bearing (not shown) mounted on a swivel base 61. The swivel base 61 is formed such that two projecting sections 61b, 61c are disposed in an opposed relationship on the top face of a disk 61a. The projecting sections 61b, 61c are respectively formed such that, in a side view, a rectangular parallelepiped portion having a semi-circular upper part inclines towards the distal end of the arm member A. Of these projecting sections, the projecting section 61c is provided with the aforesaid bearing which pivotally supports the other end of the first link 1. The first link 1 pivots about the swivel base 61 so that the action corresponding to the action of a shoulder is enabled.

Engaged with the upper ends of the two projecting sections 61b, 61c on the swivel base 61 are hooks attached to the respective undersides of spring units 7. Each of the spring units 7 has two hooks, each of which is provided at its upper and lower ends and houses a spring both ends of which are coupled to the hooks respectively. Both ends of the pivotal shaft which pivotally connects the arm member A to the first link 1 project outwardly from the first link 1, and the upper hooks of the spring units 7 are engaged with the pivotal shaft. With this arrangement, when the first link 1 inclines causing a movement of the arm member A, the arm member A is energized by the spring units 7 in a direction opposite to the moving direction.

The proximal end of the arm member A, that is, the proximal end face of the proximal end section A2 forks, forming branches. Both branches are provided with through holes respectively, which pierce their associated branches in a direction substantially perpendicular to the longitudinal direction of the arm body A1 and face each other. The second link 2 having substantially the same link length as the first link 1 includes a hole at one end thereof. The one end of the second link 2 is held between the branches extending from the proximal end section A2. A pivotal shaft passes through these holes, so that the arm member A is pivotally connected to the second link 2.

A balancer weight W having a rectangular parallelepiped block shape is securely attached to a side face of the other end of the second link 2, the side face being opposite to the face opposed to the first link 1. The other end of the second link 2 is divided into two branches which are both provided with a hole. These holes face each other and pierce the branches in a direction substantially perpendicular to a longitudinal direction of the second link 2. One end of the third link 3 is also provided with a hole and held between the branches formed at the other end of the second link 2. A pivotal shaft is provided so as to pass through these holes, thereby pivotally connecting the second link 2 and the third link 3.

The other end of the third link is also provided with a hole which is substantially parallel to the hole defined in the one end. This hole is fitted, with play, on the aforesaid pivotal shaft passing through the other end of the first link 1, whereby the other end of the third link 3 is pivotally supported on the swivel base 61. The link length of the third link 3 is substantially equal to the distance between the hole of the proximal end section A2 used for the pivotal connection of the first link 1 and the hole of the proximal end section A2 used for the pivotal connection of the second link 2, so that the arm member A, the first link 1, the second link 2 and the third link 3 constitute a parallel linkage.

The fourth link 4 has link length which is about one-half the link length of the third link 3 and is provided, at both ends, with holes which are substantially parallel to each other. The pivotal shaft for pivotally connecting the second link 2 and the third link 3 projects in an outward direction from the second link 2, and a hole defined in one end of the fourth link 4 is fitted on this pivotal shaft with play. With this arrangement, the fourth link 4 pivots relative to the second link 2 and the third link 3.

The link length of the fifth link 5 is substantially equal to the link length of the fourth link 4. A pivotal shaft projects from one side face of one end of the fifth link 5. This pivotal shaft passes through the hole defined in the other end of the fourth link 4, so that the fourth link 4 and the fifth link 5 can move (rotate) relative to each other. Also, a pivotal shaft projects from the other side face of the other end of the fifth link 5, being pivotally supported by a bearing (not shown) provided for the swivel base 61. More concretely, an arced section 61d projects from the middle part of an upper inclined surface of the projecting section 61c of the swivel base 61. The aforesaid bearing is positioned inside the arced section 61d to pivotally support the fifth link 5. The pivotal supporting point for the fifth link 5 is located beside the pivotal supporting point where the swivel base 61 pivotally supports the first link 1. These supporting points have substantially the same height.

The fourth link 4 and the fifth link 5 are connected to each other outside a quadrangle formed by the parallel linkage. Although the fourth link 4 and the fifth link 5 may be connected to each other inside the quadrangle, it is preferable, in view of the limit of the movement range of the robot determined by the interference of the links, to connect them at a position outside the quadrangle like the present embodiment.

The swivel base 61 also houses a motor for causing pivoting of the first link 1. The rotary shaft of this motor is coupled to the pivotal shaft (not shown) secured to the other end of the first link 1 through reduction gears, so that the rotation force of the motor can be transmitted to the first link 1.

The swivel base 61 houses a motor M for causing pivoting of the fifth link 5. The motor M is positioned inside the arced section 61d, with its rotary shaft being connected, through reduction gears, to the pivotal shaft which projects from the other end of the fifth link 5. This permits transmission of the rotation force of the motor M to the fifth link 5.

The swivel base 61 is mounted on the top face of a substantially cylindrical short mount 62. The mount 62 has substantially the same diameter as that of the disk 61a of the swivel base 61 and houses a motor and reduction gears (not shown). The rotation force of this motor is transmitted to the swivel base 61 to turn the swivel base 61 in a horizontal direction.

By virtue of the above-described structure, when the motor for causing pivoting of the first link 1 is actuated, the first link 1 turns to the distal end or proximal end of the arm member A. When the first link 1 turns to the distal end of the arm member A, the second link 2 pivots on the pivotal point at which it is pivotally connected to the third link 3 through substantially the same pivotal angle in substantially the same direction as those of the first link 1. Following this, the arm member A moves with its distal end at the head, while keeping a certain angle relative to a horizontal plane. At that time, the third link, the fourth link 4 and the fifth link 5 do not move.

Similarly, when the first link 1 turns to the proximal end of the arm member A, the second link 2 pivots on the pivotal connection point at which it is pivotally connected to the third link 3, through substantially the same angle as the pivotal angle of the first link 1 in substantially the same direction as the turning direction of the first link 1. The pivot turn of the second link 2 is accompanied by the movement of the arm member A. Concretely, the arm member A moves with its proximal end at the head, while keeping a certain angle relative to a horizontal plane. At that time, the third link 3, the fourth link 4 and the fifth link 5 do not move as well.

On the other hand, when the motor M is actuated, the fifth link 5 turns in such a direction as to come close to the third link 3 (hereinafter referred to as "positive direction") or in such a direction as to depart from the third link 3 (hereinafter referred to as "negative direction"). When the fifth link 5 turns in the positive direction, the fourth link 4 moves upward, thereby pressing the third link 3 so as to pivot on its pivotal supporting point with respect to the swivel base 61 in the positive direction. Following this movement, the second link 2 moves upward while keeping a certain angle relative to a horizontal plane, so that the proximal end of the arm member A rises. The arm member A pivots on its pivotal connecting point with respect to the first link 1, with its distal end moving downward. At that time, the first link 1 does not move.

When the fifth link 5 turns in the negative direction, the fourth link 4 moves downward, thereby causing the third link 3 to pivot on its pivotal connecting point relative to the swivel base 61 in the negative direction. Then, the second link 2 moves downward while keeping a certain angle relative to a horizontal plane, so that the proximal end of the arm member A is pulled down. The arm member A pivots on the pivotal connecting point with respect to the first link 1 with its distal end moving up. At that time, the first link 1 does not move as well.

Following these actions, the swivel base 61 turns and the movable parts at the distal end of the arm member A are actuated, so that the end effector can be moved to a specified position.

In the robot of the above-described structure, the load imposed on the motor M for causing pivoting of the fifth link 5 can be considerably reduced compared to the prior art for the following reasons.

Figure 6:
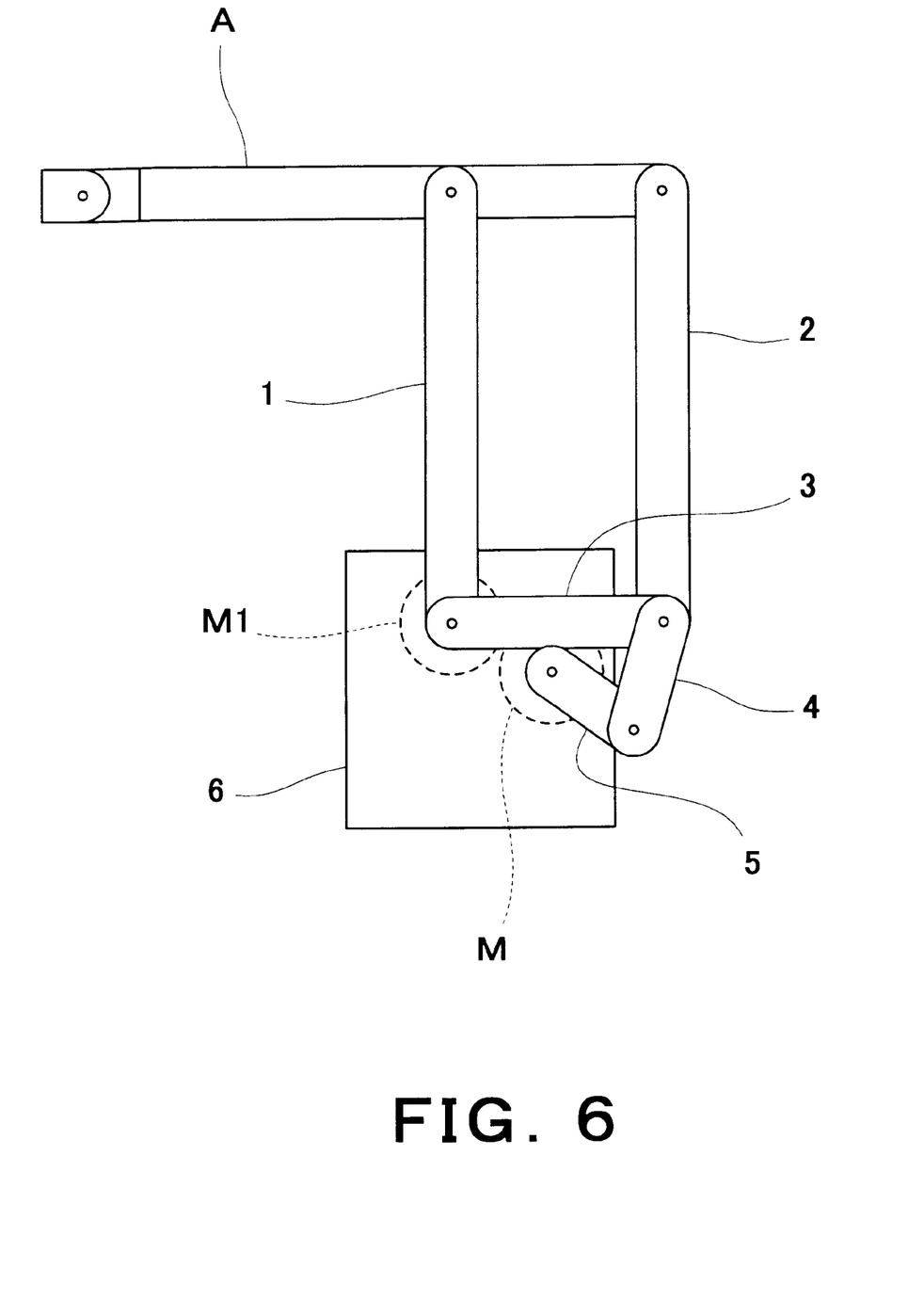
FIG. 6 is a diagrammatic side elevation showing one example of the structure of the robot according to the invention.

FIG. 6 is a diagrammatic side elevation showing one example of the structure of the robot according to the invention. As shown in FIG. 6, one end of the fourth link 4 is pivotally connected to the second link 2 and the third link 3 by the pivotal shaft for pivotally connecting the second link 2 and the third link 3 to each other, while the fifth link 5 being pivotally connected to the other end of the fourth link 4 by the pivotal shaft which extends laterally. FIG. 6 shows a case where the motor M is used as the actuator for causing pivoting of the fifth link 5.

In the robot shown in FIG. 6, when turning the first link 1 by actuation of a motor M1, the arm member A moves in the direction that the first link 1 inclines, and when turning the fifth link 5 by actuation of the motor M, the arm member A pivots on its pivotal connecting point with respect to the first link 1.

Figure 7:
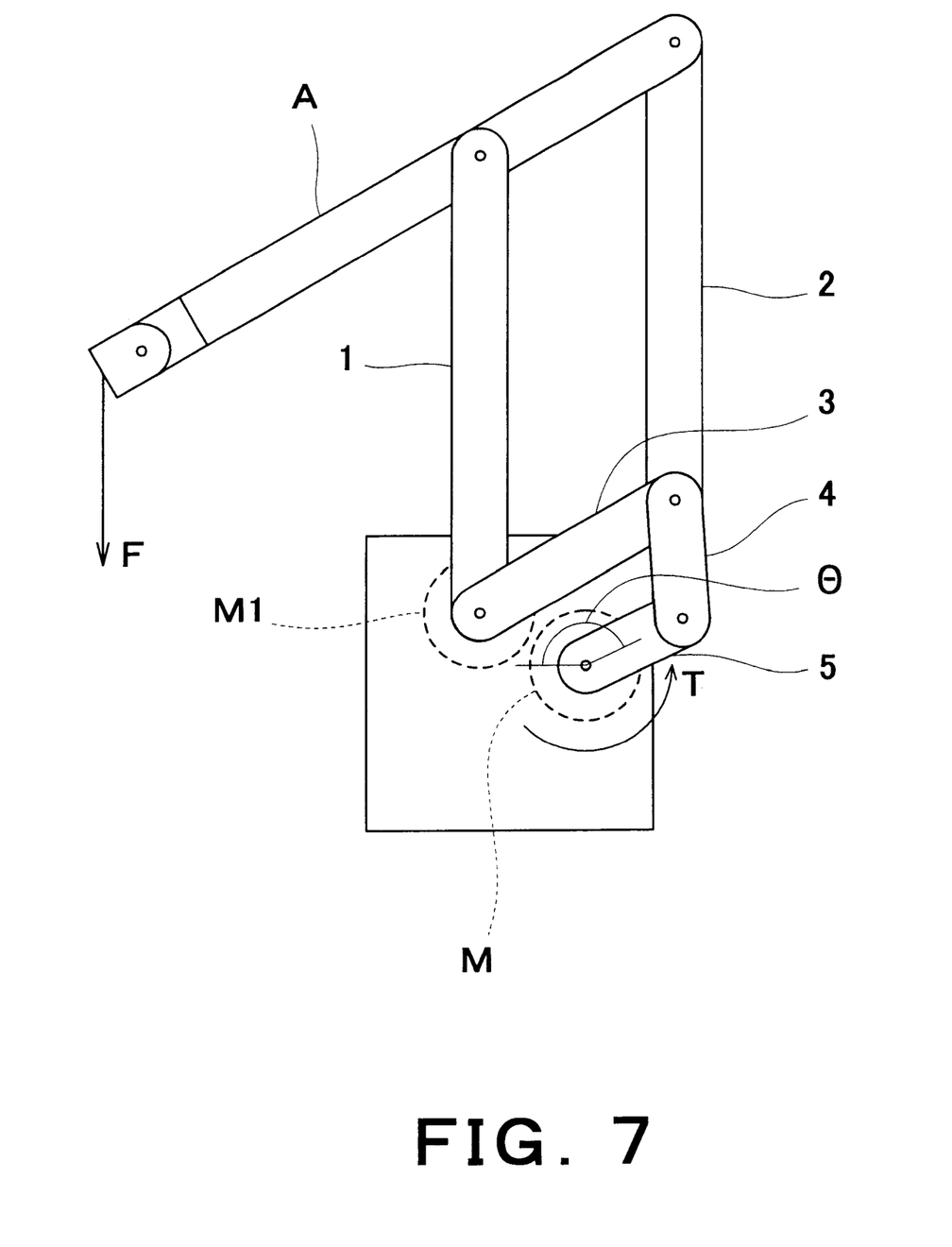
FIG. 7 is a diagrammatic side elevation showing a dynamically balanced condition of the robot of the invention.

FIG. 7 is a diagrammatic side elevation illustrating a dynamically balanced condition of the robot of the invention. As shown in FIG. 7, where a force F is exerted downward on the distal end of the arm member A and the fifth link 5 is inclined at an angle [H]Θ in a clockwise direction (in the drawing's plane) from a condition in which the fifth link 5 is horizontally placed with its connection end with respect to the fourth link 4 facing (forward) the distal end of the arm member A, load torque T is given to the pivotal shaft for pivotally supporting the fifth link 5. An approximate value of the load torque T is given by Formula (2) where the angle [H]Θ satisfies 0°[<H☐180°]<Θ<180°, by Formula (3) where the angle [H]Θ satisfies 180° [<H☐240°]<Θ<240°, and by Formula (4) where the angle [H]Θ satisfies 240°[<H☐360°]<Θ<360°. It should be noted that Formulas (2) to (4) respectively give an approximate value of the load torque T, in cases where the fourth link 4 and the fifth link 5 have the same link length and the pivotal supporting point where the first link 1 and the third link 3 are supported on the base 6 and the pivotal supporting point where the fifth link 5 is supported on the base 6 are located in the same horizontal plane.

$$T = \left[ F \cdot L[-0.4 + L5\cos\{\cos^{-1}(f(\Theta)) - \cos^{-1}(g(\Theta))\} + L5\cos\Theta] \right. \quad (2)$$

$$\left[ -L5\sin\Theta - L5\sin\{\cos^{-1}(f(\Theta)) - \cos^{-1}(g(\Theta))\} \right.$$

$$\left. \left\{ \frac{h(\Theta)}{k(\Theta)\sqrt{1-f^2(\Theta)}} + \frac{n(\Theta)}{k(\Theta)\sqrt{m(\Theta)}} \right\} \right] \right] / L3^2$$

$$\sqrt{1 - \frac{1}{L3^2}(-0.4 + L5\cos\{\cos^{-1}(f(\Theta)) - \cos^{-1}(g(\Theta))\} + L5\cos\Theta)^2}$$

$$T = \left[ F \cdot L[-0.4 + L5\cos\{\cos^{-1}(f(\Theta)) + \cos^{-1}(g(\Theta))\} + L5\cos\Theta] \right. \quad (3)$$

$$\left[ -L5\sin\Theta - L5\sin\{\cos^{-1}(f(\Theta)) + \cos^{-1}(g(\Theta))\} \right.$$

$$\left. \left\{ \frac{h(\Theta)}{k(\Theta)\sqrt{1-f^2(\Theta)}} + \frac{p(\Theta)}{k(\Theta)\sqrt{m(\Theta)}} \right\} \right] \right] / L3^2$$

$$\sqrt{1 - \frac{1}{L3^2}(-0.4 + L5\cos\{\cos^{-1}(f(\Theta)) + \cos^{-1}(g(\Theta))\} + L5\cos\Theta)^2}$$

$$T = -\left[ F \cdot L[-0.4 + L5\cos\{\cos^{-1}(f(\Theta)) + \cos^{-1}(g(\Theta))\} + L5\cos\Theta] \right. \quad (4)$$

$$\left[ -L5\sin\Theta - L5\sin\{\cos^{-1}(f(\Theta)) + \cos^{-1}(g(\Theta))\} \right.$$

$$\left. \left\{ \frac{h(\Theta)}{k(\Theta)\sqrt{1-f^2(\Theta)}} + \frac{p(\Theta)}{k(\Theta)\sqrt{m(\Theta)}} \right\} \right] \right] / L3^2$$

$$\sqrt{1 - \frac{1}{L3^2}(-0.4 + L5\cos\{\cos^{-1}(f(\Theta)) + \cos^{-1}(g(\Theta))\} + L5\cos\Theta)^2}$$

In Formulas (2) to (4), L designates the length between the pivotal connecting point where the arm member A is pivotally connected to the first link 1 and the distal end of the arm member A; L3 designates the link length of the third link 3; L5 designates the link length of the fifth link 5; and [f(H), g(H), h(H), k(H), m(H), n(H) and p(H)] f(Θ)), g(Θ)), h(Θ), k(Θ), m(Θ), n(Θ) and p(Θ)) are functions obtained from Formulas (5) to (11) respectively.

$$f(\Theta) = \frac{-0.16 - 2L5^2 + L3^2 + 0.8L5\cos\Theta}{2L5\sqrt{0.16 + L5^2 - 0.8L5\cos\Theta}} \quad (5)$$

$$g(\Theta) = \frac{-0.4 + L5\cos\Theta}{\sqrt{0.16 + L5^2 - 0.8L5\cos\Theta}} \quad (6)$$

$$h(\Theta) = (0.032 + 0.2L3^2 - 0.16L5 \cos \theta) \sin \theta \quad (7)$$

$$k(\Theta) = (0.16 + L5^2 - 0.8L5 \cos \theta)^{3/2} \quad (8)$$

$$m(\Theta) = \frac{L3^2 \sin^2 \Theta}{0.16 + L3^2 - 0.8L3\cos\Theta} \quad (9)$$

$$n(\Theta) = (-L3^3 - 0.4L3^2 \cos \theta) \sin \theta \quad (10)$$

$$p(\Theta) = (L3^3 - 0.4L3^2 \cos \theta) \sin \theta \quad (11)$$

Figure 8A:
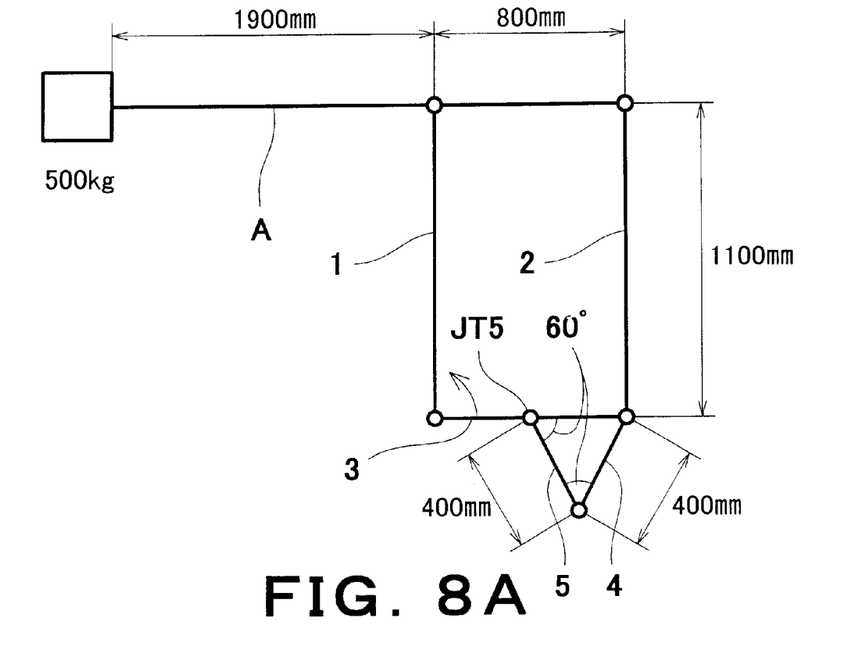
FIG. 8A is a diagrammatic view showing one concrete example of the structure of the robot according to the invention.
Figure 8B:
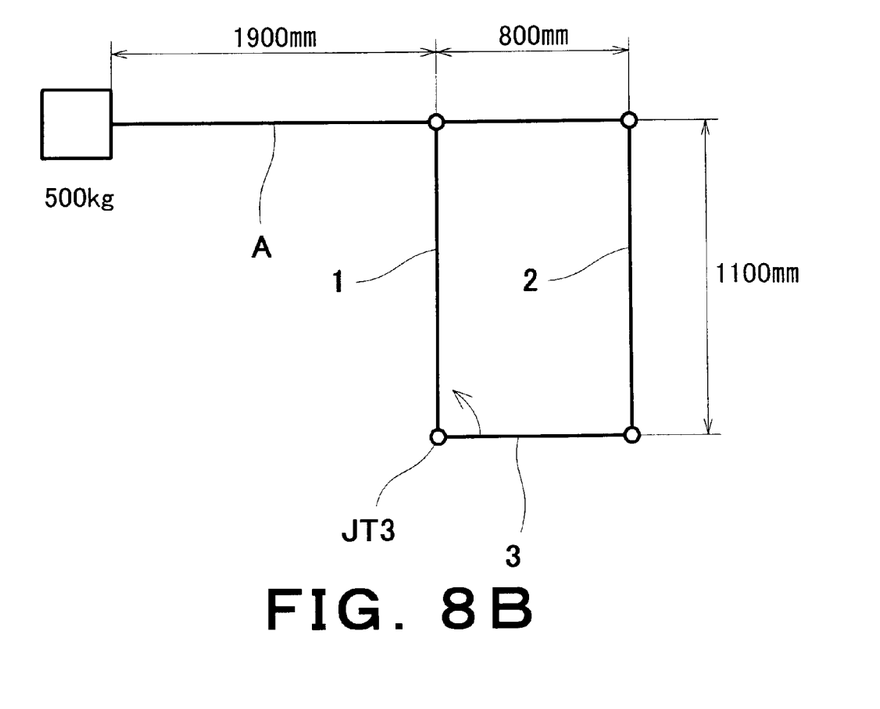
FIG. 8B is a diagrammatic view showing one concrete example of the structure of the conventional robot.
Figure 9A:
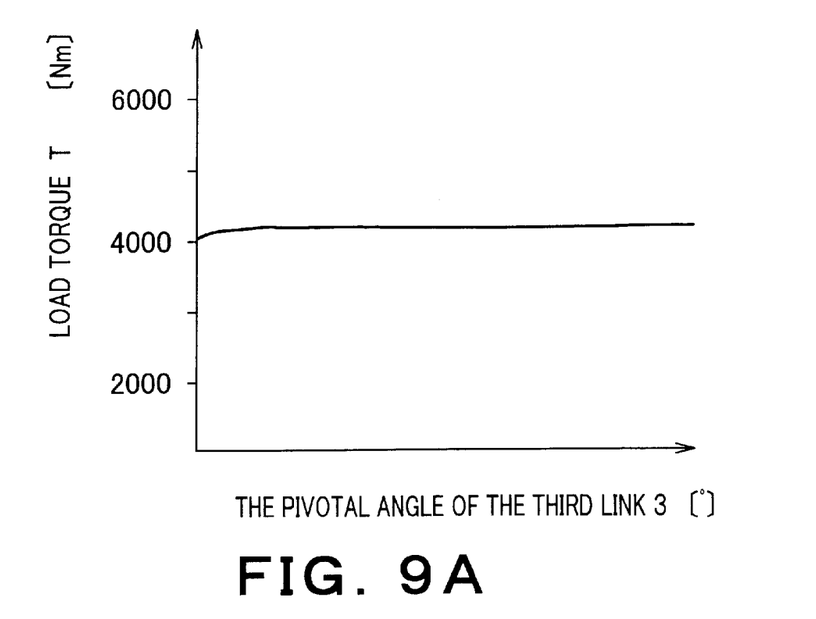
FIG. 9A is a graph showing the relationship between the pivotal angle of a third link and load torque on a motor in the robot having the structure of FIG. 8A.
Figure 9B:
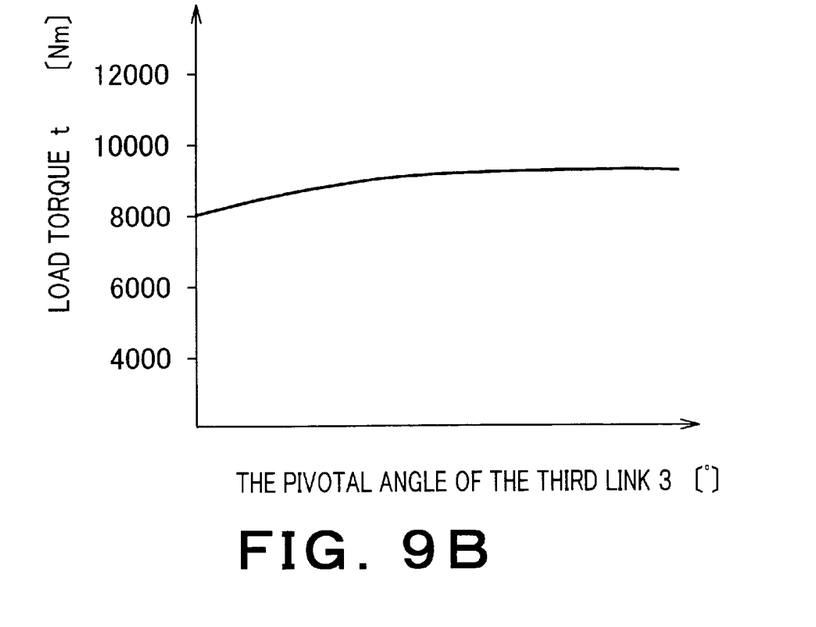
FIG. 9B is a graph showing the relationship between the pivotal angle of a third link and load torque on a motor in the robot having the structure of FIG. 8B.

The load torque T thus obtained is very small compared to the load torque imposed on the motor for causing pivoting of the third link 3 in the conventional robot shown in FIG. 1. This will be explained by comparing the results of load torque calculations executed in a structural example of the robot of the invention (see FIG. 8A) and in a structural example of the conventional robot (see FIG. 8B). In the structural example of the robot of the invention shown in FIG. 8A, the length between the pivotal connecting point where the arm member A is connected to the first link 1 and the distal end of the arm member A is 1900 mm; the link length of the first link 1 and the second link 2 is 1100 mm; the link length of the arm member A and the third link 3 is 800 mm; the link length L of the fourth link 4 and the fifth link 5 is 400 mm; the angle between the third link 3 and the fourth link 4 when the arm member A is in a horizontally positioned state (hereinafter referred to as "reference posture") is 60°; and the angle between the fourth link 4 and the fifth link 5 when the arm member A takes the reference posture is 60°. In the structural example of the conventional robot shown in FIG. 8B, the sizes of the arm member A and the first to third links 1–3 are the same as those of the structural example of the robot of the invention. FIGS. 9A and 9B respectively show the results of calculation of the load torques T and t in the robot of the invention and the conventional robot having the above structures. In this calculation, the formulas described earlier are used. Specifically, the calculation result shown in FIG. 9A is the distribution of the load torque T imposed on a pivotal shaft JT5 for the fifth link 5 in a case where the robot of the invention keeps its posture when the robot moves from its reference posture with the third link 3 pivoting through [0° to 30° in] 0° to 30° in the direction of arrow shown in the drawing on condition that an object having a mass of 500 kg is attached to the distal end of the arm member A. The calculation result shown in FIG. 9B is the distribution of the load torque t imposed on a pivotal shaft JT3 for the third link 3 when the conventional robot keeps its posture in the same situation as in the robot of the invention. turned through the fourth link 4 and the fifth link 5, it becomes possible to hire a smaller-sized actuator and expect production cost reduction. In addition, the balancer weight can be more miniaturized so that restraint on the increase of the robot in size can be expected.

As seen from FIG. 9B, the load torque t of the conventional robot is 8000 to 9500 Nm, whereas the load torque T of the robot of the invention is 4000 to 4300 Nm as seen from FIG. 9A. Accordingly, the load torque T imposed on the pivotal shaft JT5 for the fifth link 5 of the robot of the invention can be reduced to a considerable extent, compared to the load torque t imposed on the pivotal shaft JT3 for the third link 3 of the conventional robot. Thanks to this, an actuator smaller than that of the prior art can be used in the invention.

Further, since the load torque T imposed on the pivotal shaft JT5 for the fifth link 5 of the robot of the invention can be reduced to a considerable extent, compared to the load torque t imposed on the pivotal shaft JT3 for the third link 3 of the conventional robot, stresses generated in the fifth link 5, its pivotal shaft JT5 and peripheral members are reduced, so that rigidity etc. required for these members can be alleviated to make them more compact.

In addition, when the fifth link 5 is allowed to pivot by the motor, the reduction ratio of the reduction gears for transmitting the rotation force of the motor to the fifth link 5 can be made to be smaller than the reduction ratio of the reduction gears coupled to the third link 3 of the conventional robot, so that the robot of the invention can convey a workpiece at higher speed.

The actuator does not always need to be a motor. An alternative example of the actuator is such that a hydraulic or pneumatic cylinder is used in combination with a clank mechanism or linkage and the linear movement of the cylinder is converted into a rotational movement by the clank mechanism or linkage thereby pivoting the fifth link 5. However, use of a motor is more desirable in view of simple configuration and production cost reduction.

One end of the fourth link 4 is not necessarily pivotally connected to the second link 2 and the third link 3 so as to be coaxial with the pivotal connection between the second link 2 and the third link 3 as described earlier. Alternatively, the fourth link 4 may be pivotally connected to the second link 2 by employing another pivotal shaft for the pivotal connection between the second link 2 and the fourth link 4, apart from the pivotal shaft for the pivotal connection between the second link 2 and the third link 3. Another alternative is such that the fourth link 4 is pivotally connected to the third link 3 with a pivotal shaft which is exclusively used for the pivotal connection between the third link 3 and the fourth link 4 and different from the pivotal shaft for the pivotal connection between the second link 2 and the third link 3. Taking account of reduction of the number of parts and production cost reduction, it is desirable to hire the construction in which the fourth link 4 is pivotally connected to the second link 2 and the third link 3 by making use of the pivotal shaft used for the pivotal connection between the second link 2 and the third link 3.

The greater the distance between the position where the other end of the fifth link 5 is pivotally supported on the base 6 and the position where the first link 1 and the third link 3 are pivotally supported on the base 6 is, the larger the size of the base becomes. This result in an increase in the size of the robot itself. If the other end of the fifth link 5 is pivotally supported on the base 6 at a position which is a distance away from the position where the first link 1 and the third link 3 are pivotally supported on the base 6, the distance being longer than the link length of the third link 3, the movement range of the robot is small for the following reason.

Figure 10:
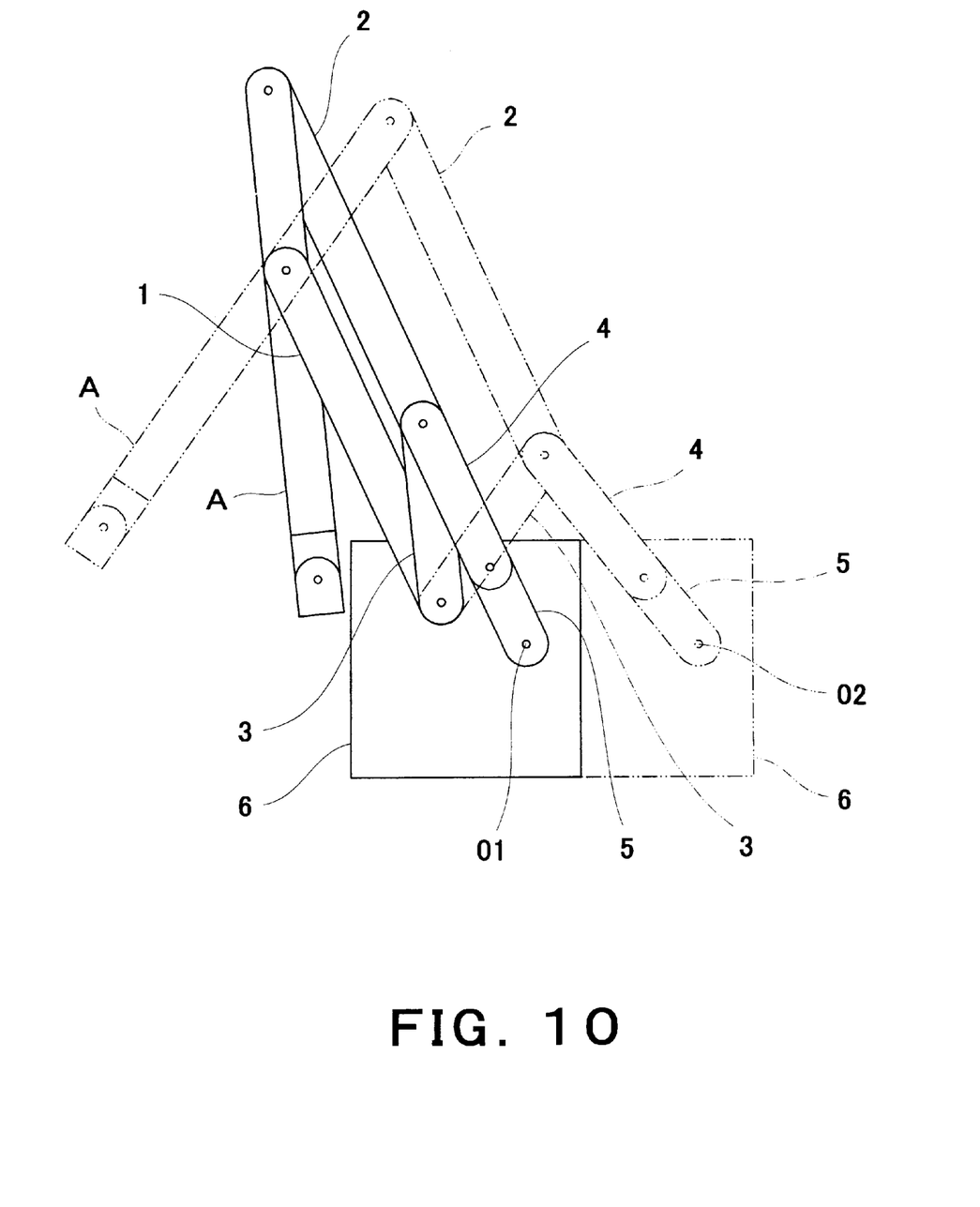
FIG. 10 is a diagrammatic side elevation showing a movement range of the robot according to the invention.

FIG. 10 is a diagrammatic side elevation illustrating a movement range for the robot of the invention. If the other end of the fifth link 5 is pivotally supported on the base 6 by a pivotal shaft O1 as indicated by solid line in FIG. 10, the pivotal shaft O1 being located at a position which is a distance away from the position where the first link 1 and the third link 3 are pivotally supported on the base 6, the distance being shorter than the link length of the third link 3, the longitudinal direction of the arm member A is substantially vertical when the fourth link 4 and the fifth link 5 are aligned (i.e., when the robot reaches the limit of its movement range).

On the other hand, if the other end of the fifth link 5 is pivotally supported on the base 6 by a pivotal shaft O2 as indicated by two dot chain line in FIG. 10, the pivotal shaft O2 being located at a position which is a distance away from the position where the first link 1 and the third link 3 are pivotally supported on the base 6, the distance being longer than the link length of the third link 3, the inclination angle of the arm member A becomes smaller than the inclination angle of the arm member A indicated by solid line, at the time the fourth link 4 and the fifth link 5 are aligned. Accordingly, a sufficient movement range can be ensured for the robot by pivotally supporting the other end of the fifth link 5 on the base 6 at a position which is a distance away from the position where the first link 1 and the third link 3 are pivotally supported on the base 6, the distance being shorter than the link length of the third link 3.

Preferably, the position at which the other end of the fifth link 5 is pivotally supported on the base 6 is a distance away from the position where the first link 1 and the third link 3 are pivotally supported on the base 6, the distance being shorter than the length which is 0.8 times the link length of the third link 3. This makes it possible to ensure a more adequate movement range for the robot.

The longer the link length of the fifth link 5 is, the more the load torque imposed on the actuator (motor M) for causing pivoting of the fifth link 5 increases. The shorter the link length of the fifth link 5, the smaller the movement range of the arm member A. For this reason, the link length of the fifth link 5 should be set taking the output of the motor M and the movement range of the arm member A into account. Therefore, by setting the link length of the fifth link 5 to be 0.3 to 0.8 times the link length of the third link 3, the load torque imposed on the motor M can be prevented from excessively increasing and the movement range of the arm member A can be prevented from becoming excessively small.

The shorter the link length of the fourth link 4, the smaller the movement range of the arm member A. The longer the link length of the fourth link 4, the larger the movement range of the arm member A, but the larger the size of the robot itself. Further, the longer the link length of the fourth link 4 becomes relative to the link length of the fifth link 5, the smaller the angle formed by the fourth link 4 and the fifth link 5 becomes. Generally, it is undesirable for a linkage to have an excessively acute angle between two links in view of the rigidity of the linkage. For this reason, the link length of the fourth link 4 should be set in consideration of the movement range of the arm member A, the size of the robot, the rigidity of the linkage and others. By setting the link length of the fourth link 4 to be 0.9 to 1.1 times the link length of the fifth link 5, the movement range of the arm member A can be prevented from becoming excessively small, the size of the robot itself can be prevented from increasing, and practically sufficient rigidity can be ensured for the point where the fourth link 4 and the fifth link 5 are coupled to each other.

In cases where the third link 3 is designed to be turned directly by an actuator as shown in FIG. 1 in a relatively large-sized robot having a mass capacity of 100 kg or more, the load torque imposed on the actuator is too great to be dealt with by the output of a commonly used actuator. By employing such an arrangement that the fifth link 5 is turned by an actuator and the third link 3 is turned through the fourth link 4 and the fifth link 5, it becomes possible to hire a smaller-sized actuator and expect production cost reduction. In addition, the balancer weight can be more miniaturized so that restraint on the increase of the robot in size can be expected.

In most robots having a mass capacity of 100 kg or more, the link length of the third link 3 ranges from 300 to 1000 mm. In this case, it is desirable that the link lengths of the fourth link 4 and the fifth link 5 be 150 to 750 mm and that the angle formed by the third link 3 and the fourth link 4 and the angle formed by the fourth link 4 and the fifth link 5 when the robot takes the reference posture be [30° to] 30° to 70°. The size of the robot itself and the movement range of the robot can be properly set by adequately setting the above link lengths and angles within the aforesaid ranges according to the sizes and specifications etc. of the parts constituting the robot.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A robot comprising:

a base;

a bar-shaped arm member having a distal end and a proximal end;

a first link one end of which is pivotally connected to an intermediate section of the arm member while the other end being pivotally supported on the base;

a second link one end of which is pivotally connected to the proximal end of the arm member;

a third link one end of which is pivotally connected to the other end of the second link while the other end being pivotally supported on the base so as to be coaxial with the other end of the first link;

a fourth link one end of which is pivotally connected to at,least either one of the other end of the second link and the one end of the third link;

a fifth link one end of which is pivotally connected to the other end of the fourth link while the other end being pivotally supported on the base, wherein the link length of the fifth link being shorter than that of the third link; and an actuator for causing the fifth link to pivot on the other end of the fifth link, wherein the arm member, the first link, the second link and the third link constitute a four bar linkage.

2. The robot according to claim 1, wherein the other end of the fifth link is pivotally supported on the base at a position that is a distance away from the position where the first link and the third link are pivotally supported on the base, the distance being shorter than the link length of the third link.

3. The robot according to claim 1, wherein the link length of the fifth link is 0.3 to 0.8 times the link length of the third link.

4. The robot according to claim 1, wherein the link length of the fourth link is 0.9 to 1.1 times the link length of the fifth link.

5. The robot according to claim 1, wherein the mass capacity of the robot is 100 kg or more.

* * * * *

UNITED STATES PATENT AND TRADEMARK OFFICE
CERTIFICATE OF CORRECTION

PATENT NO. : 6,748,819 B2
DATED : June 15, 2004
INVENTOR(S) : Yuji Maeguchi et al.

It is certified that error appears in the above-identified patent and that said Letters Patent is hereby corrected as shown below:

Title page,
Item [75], Inventors, replace "Kobe" with -- Hyogo --, replace "Kagamihara" with -- Gifu --, and replace "Kakogawa" with -- Hyogo --.

Column 14,
Line 9, delete "at,least" and replace with -- at least --.

Signed and Sealed this

Third Day of May, 2005

JON W. DUDAS
*Director of the United States Patent and Trademark Office*